(12) United States Patent
Cha et al.

(10) Patent No.: US 10,102,125 B2
(45) Date of Patent: Oct. 16, 2018

(54) PCI DEVICE, INTERFACE SYSTEM INCLUDING THE SAME, AND COMPUTING SYSTEM INCLUDING THE SAME

(71) Applicant: SAMSUNG ELECTRONICS CO., LTD., Suwon-si, Gyeonggi-Do (KR)

(72) Inventors: Hyun Seok Cha, Osan-si (KR); Ki Jo Jung, Gwacheon-si (KR); Ki Chul Noh, Suwon-si (KR); Yeong Kyun Lee, Seongnam-si (KR); Yong Tae Jeon, Pohang-si (KR); Han Chan Jo, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 99 days.

(21) Appl. No.: 14/864,461

(22) Filed: Sep. 24, 2015

(65) Prior Publication Data

US 2016/0098358 A1 Apr. 7, 2016

(30) Foreign Application Priority Data

Oct. 2, 2014 (KR) ........................ 10-2014-0133213

(51) Int. Cl.
*G06F 13/12* (2006.01)
*G06F 12/0811* (2016.01)
*G06F 13/42* (2006.01)
*G06F 13/40* (2006.01)
*G06F 12/1009* (2016.01)

(52) U.S. Cl.
CPC ...... *G06F 12/0811* (2013.01); *G06F 12/1009* (2013.01); *G06F 13/404* (2013.01); *G06F 13/4282* (2013.01); *G06F 2212/651* (2013.01); *G06F 2212/656* (2013.01)

(58) Field of Classification Search
CPC .................................. G06F 3/00; G06F 3/0673
USPC ........................................................ 710/316
See application file for complete search history.

(56) References Cited

U.S. PATENT DOCUMENTS

| | | | |
|---|---|---|---|
| 7,143,200 B2 | 11/2006 | Tomobe | |
| 7,533,210 B2 | 5/2009 | Chatterjee et al. | |
| 7,577,777 B2 | 8/2009 | Lee | |
| 7,941,568 B2 | 5/2011 | Arndt et al. | |
| 8,281,108 B2 | 10/2012 | Vorbach et al. | |
| 8,521,941 B2 | 8/2013 | Regula | |
| 8,595,434 B2 | 11/2013 | Northcutt et al. | |
| 8,612,662 B2 | 12/2013 | Norden | |
| 2006/0195626 A1* | 8/2006 | Arndt | G06F 12/0653 710/10 |

(Continued)

*Primary Examiner* — Titus Wong
(74) *Attorney, Agent, or Firm* — Volentine, Whitt & Francos, PLLC

(57) ABSTRACT

A peripheral component interconnect (PCI) device includes a first memory which includes a plurality of page buffers, a base address register which includes a plurality of base addresses, and a first address translation unit which translates each of the plurality of base addresses to a corresponding one of a plurality of virtual addresses. A map table includes a plurality of map table entries each accessed in correspondence to each of the plurality of virtual addresses, and maps each of the plurality of virtual addresses onto a physical address of physical addresses of the plurality of page buffers. The first address translation unit translates each of the plurality of virtual addresses to a corresponding one of the physical addresses using the map table.

19 Claims, 11 Drawing Sheets

(56) References Cited

U.S. PATENT DOCUMENTS

| | | |
|---|---|---|
| 2006/0212870 A1* | 9/2006 | Arndt .................... G06F 13/102 |
| | | 718/104 |
| 2006/0253682 A1 | 11/2006 | Armstrong et al. |
| 2008/0072223 A1 | 3/2008 | Cowperthwaite et al. |
| 2009/0276544 A1* | 11/2009 | Arndt .................... G06F 13/387 |
| | | 710/3 |
| 2011/0022818 A1* | 1/2011 | Kegel ................. G06F 12/1081 |
| | | 711/206 |
| 2012/0185632 A1* | 7/2012 | Lais ..................... G06F 13/404 |
| | | 710/308 |

\* cited by examiner

FIG. 3

| MTE1 | OFS1 | PMA1 | ATT1 |
|---|---|---|---|
| MTE2 | OFS2 | PMA2 | ATT2 |
| MTE3 | OFS3 | PMA3 | ATT3 |
| MTE4 | OFS4 | PMA4 | ATT4 |
| | HOF | PAF | ATF (Optional) |

FIG. 5

| MTE1 | OFS1 | PMA1 | ATT1 |
|------|------|------|------|
| MTE2 | OFS2 | PMA1 | ATT1 |
| MTE3 | OFS3 | PMA1 | ATT1 |
| MTE4 | OFS4 | PMA1 | ATT1 |
|      | HOF  | PAF  | ATF (Optional) |

PCI DEVICE, INTERFACE SYSTEM INCLUDING THE SAME, AND COMPUTING SYSTEM INCLUDING THE SAME

CROSS-REFERENCE TO RELATED APPLICATION

This application claims priority under 35 U.S.C. § 119(a) from Korean Patent Application No. 10-2014-0133213 filed on Oct. 2, 2014, the disclosure of which is hereby incorporated by reference in its entirety.

FIELD

Embodiments of the present inventive concept relate to a peripheral component interconnect (PCI) device, and particularly to a PCI device which supplies a map table (or virtual memory) in which the PCI device has a virtual address to a PCI host when the PCI host accesses an internal memory of the PCI device, a PCI interface system including the same, and a computing system including the same.

BACKGROUND

Peripheral component interconnect (PCI) is a local bus standard which connects a central processing unit and a peripheral device of a computer system. A PCI express (PCIe) which is currently widely used is an interface having a more improved speed as a high-speed serial computer expansion bus standard which is designed for replacing a PCI bus standard or a PCI eXtended (PCI-X) bus standard.

In the related art, when data requested by a PCI host is not stored in successive positions of an internal memory of a PCI device, but is stored to be dispersed, successive spaces are separately allocated in the internal memory, the data is copied in the successive spaces, and the copied data is supplied to the PCI host. Moreover, when the data requested by the PCI host includes repeated values, an internal memory space as much as a magnitude of repetition is allocated, the data is repeatedly copied, and the copied data is supplied to the PCI host.

According to a mode of the related art, space in the internal memory of the PCI device is unnecessarily wasted, and system performance is deteriorated due to a transaction between the PCI host and the PCI device.

SUMMARY

A technical object of the present inventive concept is to provide a PCI device which accesses a map table (or virtual memory) using a virtual address when a PCI host accesses an internal memory of the PCI device, and supplies data stored in a page buffer corresponding to a physical address stored in a map table entry corresponding to the virtual address to the PCI host. In particular, the technical object of the present inventive concept is to provide a PCI device which can improve a space efficiency of the internal memory of the PCI device when data to be processed by the PCI host is stored in discrete positions in the internal memory or data is repeated, a PCI interface system having the PCI device, and a computing system having the PCI device.

An exemplary embodiment of the present inventive concept is directed to a PCI device, including a first memory including a plurality of page buffers, a base address register including a plurality of base addresses, a first address translation unit which translates each of the plurality of base addresses to each of a plurality of corresponding virtual addresses, and a map table which includes a plurality of map table entries each accessed in correspondence to each of the plurality of virtual addresses, and maps each of the plurality of virtual addresses onto one of physical addresses of the plurality of page buffers, in which the first address translation unit translates each of the plurality of virtual addresses to a corresponding physical address using the map table.

According to an exemplary embodiment, the PCI device may further include a second address translation unit which translates each of the plurality of virtual addresses to a corresponding physical address using the map table. Each of the plurality of map table entries includes a host off-set field which stores a host off-set, and a physical address field which stores one of the physical addresses.

The PCI device further includes a map table management unit, the map table management unit allocates each of the plurality of virtual addresses to each of the plurality of map table entries and stores the host off-set and the one physical address in each of the plurality of map table entries so as to access each of the plurality of map table entries.

According to an exemplary embodiment, when data to be processed by a host is stored in discrete positions in the first memory, the map table management unit sequentially stores each of the host-off-sets in a host off-set field of each of a plurality of successive map table entries, and stores physical addresses of page buffers storing the data in a physical address field of each of the plurality of successive map table entries according to a sequence of the data. According to another exemplary embodiment, when data to be processed by a host repeatedly includes data stored in one of the page buffers, the map table management unit stores a physical address of the one page buffer in a physical address field of each of map table entries corresponding to the number of repetitions.

Each of the plurality of map table entries may further include an attribute field which sets at least one of a read attribute and a write attribute for a page buffer corresponding to a physical address stored in the physical address field.

The PCI device may further include a second memory, and the map table may be stored in one of the first memory and the second memory. According to an exemplary embodiment, when the map table is stored in the first memory, the second memory loads at least one of the plurality of map table entries included in the map table from the first memory. The PCI device may be one of a solid state drive (SSD), a universal flash storage (UFS), and a hard disk drive (HDD).

An exemplary embodiment of the present inventive concept is directed to an interface system, including a PCI bus, at least one PCI device connected to the PCI bus, and a host controller that connects the host and the at least one PCI device through the PCI bus according to a request of a host, in which the at least one PCI device includes a first memory including a plurality of page buffers, a base address register including a plurality of base addresses, a first address translation unit which translates each of the plurality of base addresses to each of a plurality of corresponding virtual addresses, and a map table which includes a plurality of map table entries each accessed corresponding to each of the plurality of virtual addresses and maps each of the plurality of virtual addresses onto a physical addresses of one of the plurality of page buffers, and in which the first address translation unit translates each of the plurality of virtual addresses to a corresponding physical address using the map table.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 3 is a diagram showing an internal field of a map table entry according to an exemplary embodiment shown in FIG. 2;

FIG. 5 is a diagram showing an internal field of a map table entry according to the exemplary embodiment shown in FIG. 4;

DETAILED DESCRIPTION OF THE EMBODIMENTS

Figure 1:
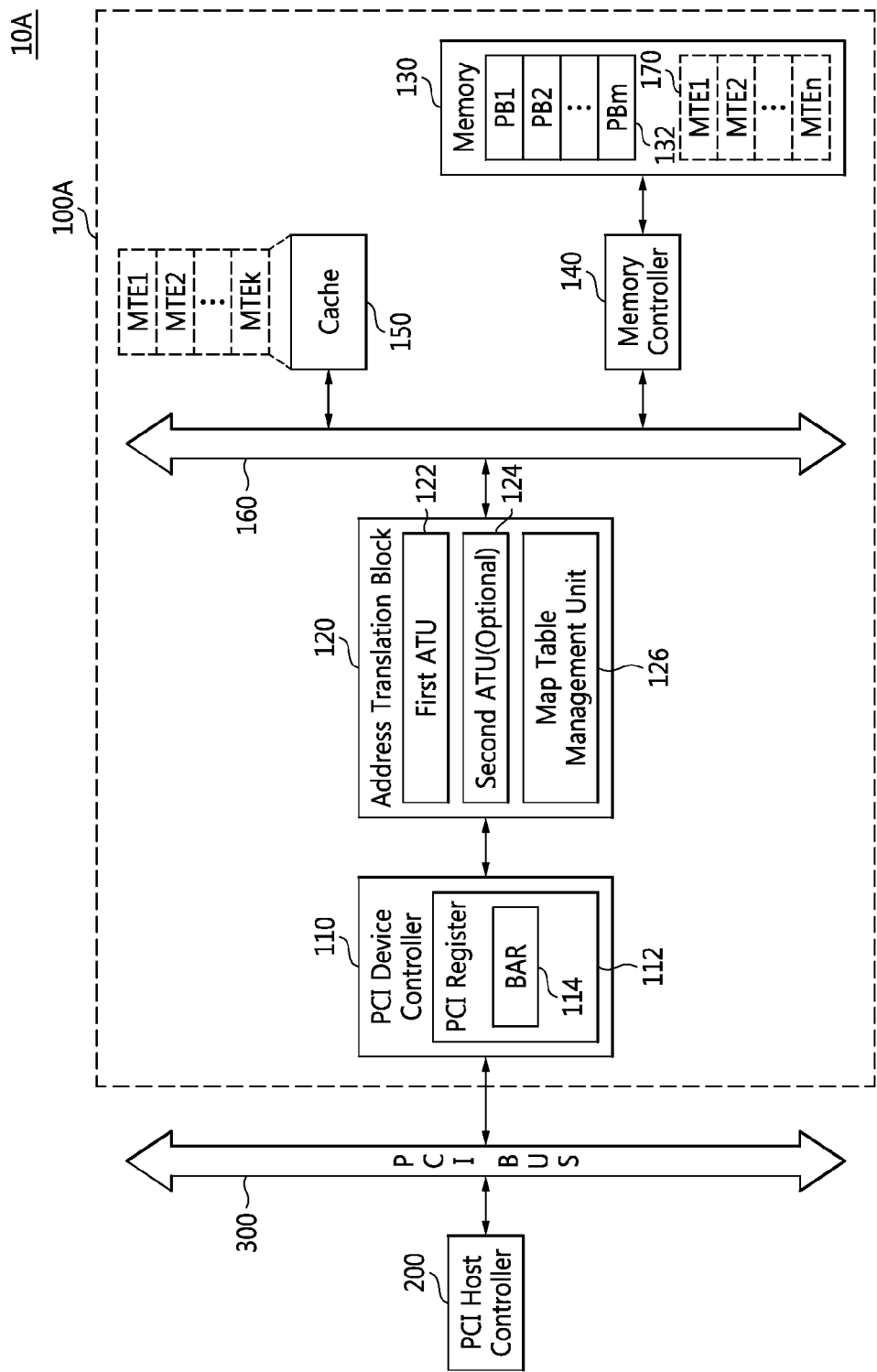
FIG. 1 is a schematic block diagram of a PCI device and an interface system including the PCI device according to an exemplary embodiment of the present inventive concept.

The present inventive concept now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

A peripheral component interconnect (PCI) in the present specification is used herein as including a PCI, a PCI-extended (PCI-X), and a PCI express (PCIe).

FIG. 1 is a schematic block diagram of a PCI device and an interface system including the PCI device according to an exemplary embodiment of the present inventive concepts. Referring to FIG. 1, an interface system 10A according to an exemplary embodiment of the present inventive concept includes a peripheral component interconnect (PCI) device 100A, a PCI host controller 200, and a PCI bus 300.

The interface system 10A may be a PCI interface system. The interface system 10A including one PCI device 100A is shown in FIG. 1; however, the interface system 10A may include one or more PCI devices.

The PCI device 100A may be connected to the PCI host controller 200 through the PCI bus 300. The PCI device 100A includes a PCI device controller 110, an address translation block 120, a memory 130, a memory controller 140, a cache 150, and an internal bus 160.

The PCI device controller 110 may control an operation of the PCI device 100A. The PCI device controller 110 includes a PCI register 112.

The PCI register 112 includes information on the PCI device 100A. Accordingly, the PCI host controller 200 may recognize the PCI device 100A using the PCI register 112, and a PCI host (not shown) may access the PCI device 100A. The PCI register 112 includes a base address register (BAR) 114.

The BAR 114 may include a plurality of base addresses. The plurality of base addresses may be set by a basic input output system (BIOS) in an initialization process of the interface system 10A or a computing system. The PCI host may access a memory space and/or an input/output space in the PCI device 100A using one of the plurality of base addresses and an address off-set.

An address translation block 120 may include a first address translation unit (ATU) 122 and a map table management unit 126.

The first ATU 122 may translate one of the plurality of base addresses and the host off-set into a corresponding virtual address. The virtual address is an address for access to one (e.g., MTE1) of a plurality of map table entries MTE1 to MTEn, where n is a natural number, included in the map table 170.

According to an exemplary embodiment, the first ATU 122 may translate the virtual address into a physical address of a corresponding page buffer (e.g., PB1) in a memory 130 using the map table 170. According to another exemplary embodiment, the address translation block 120 may further include a second ATU 124 which translates the virtual address to the physical address of the corresponding page buffer PB1 in the memory 130 using the map table 170.

The map table management unit 126 may allocate different virtual addresses, respectively, to access each of the map table entries MTE1 to MTEn in the map table 170. The map table management unit 126 may manage (e.g., generation, correction, and deletion) the map table 170. The map table management unit 126 may be embodied in hardware or firmware. According to an exemplary embodiment, the first ATU 122, the second ATU 124, and the map table management unit 126 may be embodied in one chip, or in a separate chip.

The memory 130 operates according to a control of the memory controller 140. The memory 130 may include a page buffer block 132 for storing data, and the page buffer block 132 may include a plurality of page buffers PB1 to PBm, where m is a natural number. The memory 130 may store the map table 170 which is generated or corrected by the map table management unit 126. The memory 130 may be a volatile memory, e.g., a dynamic random access memory (DRAM); however, the memory is not limited thereto.

The map table 170 may include mapping information in which the address translation block 120 translates a virtual address to a corresponding physical address. The map table 170 includes a plurality of map table entries MTE1 to MTEn. The map table 170 may be generated by the map table management unit 126 in an initialization process of the PCI device 100A.

A cache 150 may load all or a portion (MTE1 to MTEk, where k is a natural number smaller than or equal to n) of the map table entries MTE1 to MTEn included in the map table 170 from the memory 130. The map table entries MTE1 to MTEk loaded to the cache 150 may be updated by the map table management unit 126. An update process of the map table management unit 126 may be a process of storing new information in the map table entries MTE1 to MTEk, or a process of deleting the stored information. The updated map table entries MTE1 to MTEk may be stored in the memory 130. The cache 150 may be embodied in a register or a static random access memory (SRAM) which has a faster processing speed than the memory 130; however, the cache is not limited thereto.

Figure 2:
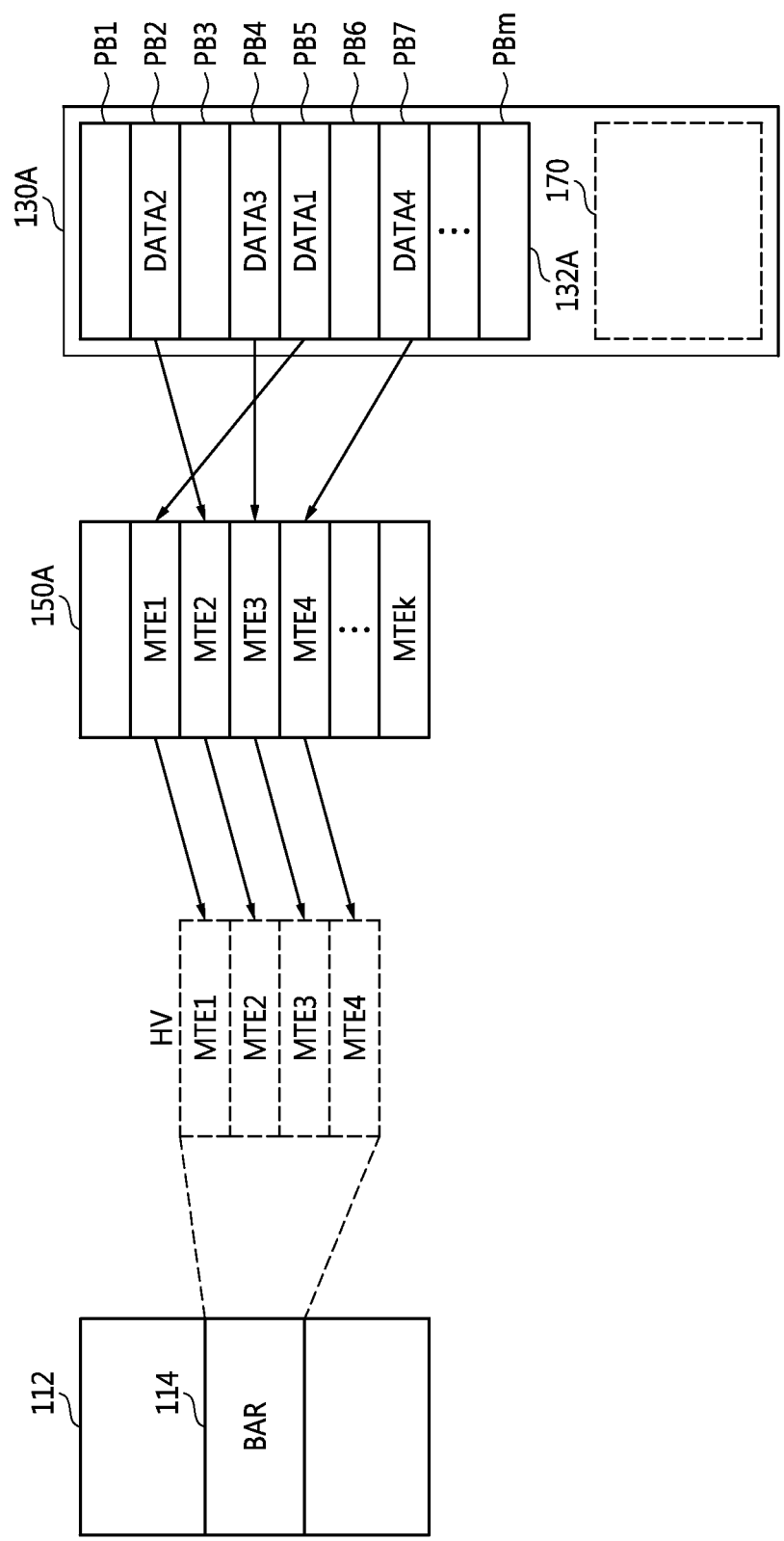
FIG. 2 is a diagram illustrating an exemplary embodiment of a process which processes data using a map table of the PCI device shown in FIG. 1.

FIG. 2 is an exemplary embodiment of a process which processes data using a map table of the PCI device shown in FIG. 1. Referring to FIGS. 1 and 2, a PCI host (not shown) may access a map table entry (e.g., a first map table entry MTE1) which is translated using one base address included in a BAR 114 of the PCI register 112 and an address off-set, and corresponds to a virtual address. For example, it is assumed that data to be processed by the PCI host sequentially includes a first data DATA1, a second data DATA2, a third data DATA3, and a fourth data DATA4.

As shown in FIG. 2, it is assumed that the first data DATA1 is stored in a fifth page buffer PB5, the second data DATA2 is stored in a second page buffer PB2, the third data DATA3 is stored in a fourth page buffer PB4, and the fourth data DATA4 is stored in a seventh page buffer PB7. That is, each of the data DATA1 to DATA4 may be stored in a discrete position in a page buffer block 132A of a memory 130A.

A cache 150A loads a portion or all MTE1 to MTEk of the map table entries MTE1 to MTEn of the map table 170 stored in the memory 130A.

The map table management unit 126 may store a physical address corresponding to a sequence of each data DATA1 to DATA4 in each of a first map table entry MTE1 to a fourth map table entry MTE4. When each of the first map table entry MTE1 to the fourth map table entry MTE4 stores each of the physical addresses, a storage operation of the map table management unit 126 may be omitted.

The PCI host may successively access the first map table entry MTE1 to the fourth map table entry MTE4. That is, from a host viewpoint (HV), since the first map table entry MTE1 to the fourth map table entry MTE4 are successive, the PCI host may recognize that each of the data DATA1 to DATA4 is successively stored. The PCI device 100A may successively supply each of the data DATA1 to DATA4 to the PCI host using a virtual address of the first map table entry MTE1 and a host off-set for the virtual address. Accordingly, a transaction between the PCI host and the PCI device 100A may be reduced or minimized.

FIG. 3 is an internal field of a map table entry according to an exemplary embodiment shown in FIG. 2. Referring to FIGS. 1 to 3, each of the map table entries MTE1 to MTE4 includes a host off-set field HOF and a physical address field PAF.

The host off-set field HOF stores a host off-set for a virtual address translated by the first ATU 122. The host off-set is a virtual address access unit between the PCI host and the PCI device 100A. The physical address field PAF may store a physical address for accessing one of the page buffers PB1 to PBm.

According to an exemplary embodiment of FIG. 2, a physical address PMA1 of the fifth page buffer PB5 may be stored in a physical address field PAF of the first map table entry MTE1, a physical address PMA2 of the second page buffer PB2 may be stored in a physical address field PAF of a second map table entry MTE2, a physical address PMA3 of the fourth page buffer PB4 may be stored in a physical address field PAF of a third map table entry MTE3, and a physical address PMA4 of the seventh page buffer PB7 may be stored in a physical address field PAF of the fourth map table entry MTE4. That is, each of the physical addresses PMA1 to PMA4 corresponds to a sequence of each of the data DATA1 to DATA4.

According to an exemplary embodiment, each of the map table entries MTE1 to MTE4 may further include an attribute field (ATF) for setting a read attribute and/or a write attribute of a page buffer. For example, when the attribute field ATF is assumed to have two bits, an upper one-bit of the two-bits is a bit for setting the read attribute, and a lower one-bit is for setting the write attribute.

For example, when the upper one-bit of the attribute field ATF of the first map table entry MTE1 is set to "0" or "1", data DATA1 of a page buffer PB5 corresponding to the first physical address PMA1 may be read. When the lower one-bit of the attribute field ATF of the first map table entry MTE1 is set to "1" or "0", data may be written in the page buffer PB5 corresponding to the first physical address PMA1.

On the other hand, when the upper one-bit of the attribute field ATF of the first map table entry MTE1 is set to "0" or "1", data DATA1 of the page buffer PB5 corresponding to the first physical address PMA1 may not be read. When the lower one-bit of the attribute field ATF of the first map table entry MTE1 is set to "0" or "1", data may not be written in the page buffer PB5 corresponding to the first physical address PMA1.

Figure 4:
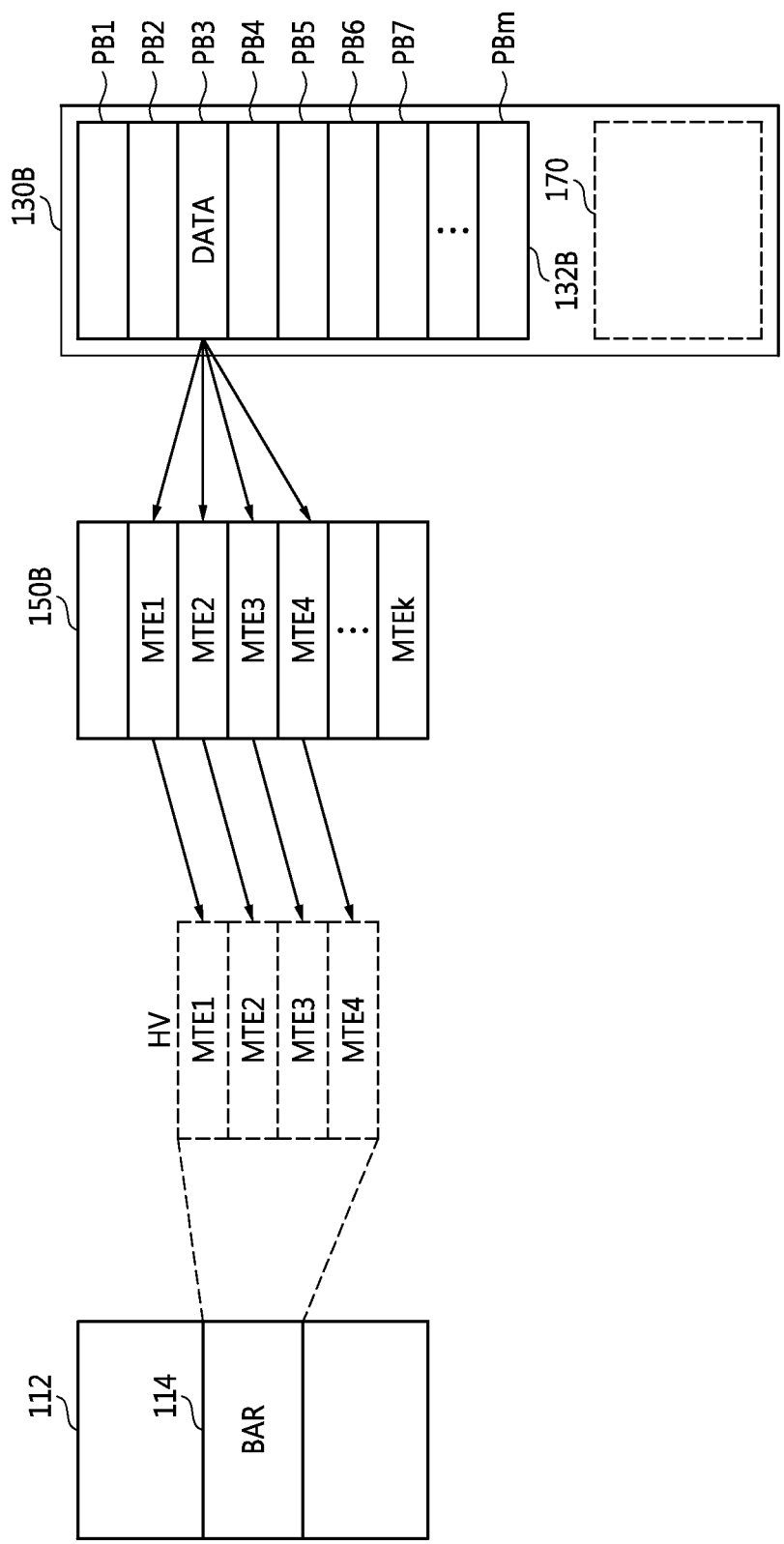
FIG. 4 is a diagram illustrating another exemplary embodiment of the process which processes data using the map table of the PCI device shown in FIG. 1.

FIG. 4 is another exemplary embodiment of the process which processes data using a map table of the PCI device shown in FIG. 1. Referring to FIGS. 1 and 4, the PCI host (not shown) may access a map table entry (e.g., the first map table entry MTE1) which is converted using one base address included in the BAR 114 of the PCI register 112 and an address off-set, and corresponds to a virtual address. For example, it is assumed that data to be processed by the PCI host repeatedly includes data DATA stored in one page buffer (e.g., the third page buffer PB3) of a memory 130B.

A cache 150B loads a portion or all MTE1 to MTEk of the map table entries MTE1 to MTEn of the map table 170 stored in the memory 130B. For example, when data to be processed by the PCI host includes data DATA stored in the third page buffer PB3 repeatedly four times, the map table management unit 126 may store a physical address of the third page buffer PB3 in each of the first map table entry MTE1 to the fourth map table entry MTE4. When each of the first map table entry MTE1 to the fourth map table entry MTE4 already stores the physical address, a storage operation of the map table management unit 126 may be omitted. The PCI device 100A may repeatedly supply the data DATA to the PCI host using a virtual address of the first map table entry MTE1 and a host off-set for the virtual address.

FIG. 5 is an internal field of a map table entry according to an exemplary embodiment shown in FIG. 4. Referring to FIGS. 1, and 3 to 5, map table entries MTE1 to MTE4 shown in FIG. 5 have substantially the same structure as the map table entries MTE1 to MTE4 shown in FIG. 3.

According to an exemplary embodiment of FIG. 4, the same physical address, i.e., the physical address PMA1 of the third page buffer PB3, is stored in a physical address field PAF of each of the map table entries MTE1 to MTE4. Since the physical addresses PMA1 stored in the map table entries MTE1 to MTE4 are the same as each other, the same attribute value ATT1 may be stored in the attribute field ATF.

Figure 6:
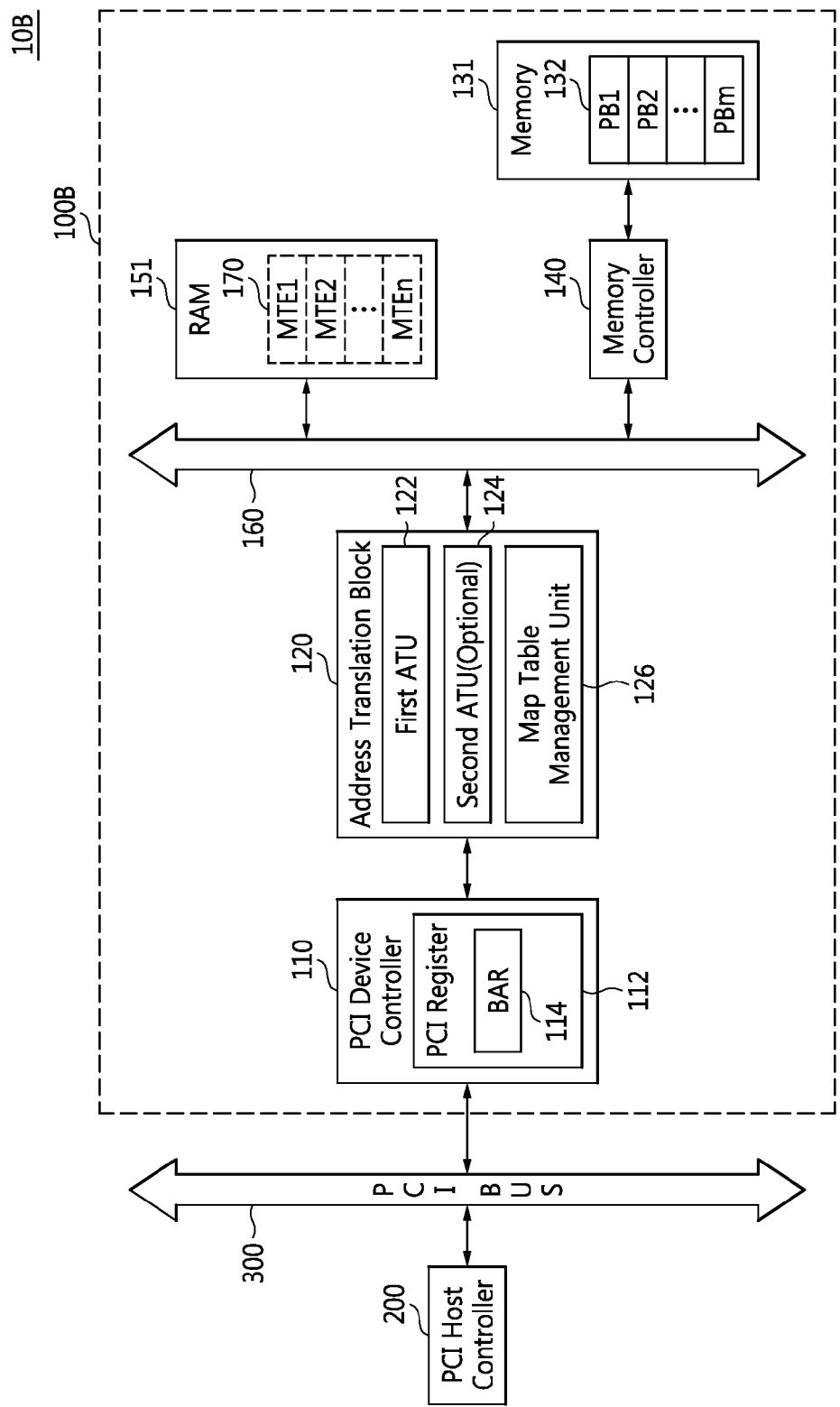
FIG. 6 is a schematic block diagram of a PCI device and an interface system including the PCI device according to another exemplary embodiment of the present inventive concept.

FIG. 6 is a schematic block diagram of a PCI device and an interface system including the PCI device according to another exemplary embodiment of the present inventive concept. Referring to FIGS. 1 and 6, an interface system 10B and the PCI device 100B shown in FIG. 6 are substantially the same as the interface system 10A and the PCI device 100A shown in FIG. 1 except for a memory 131 and a random access memory (RAM) 151.

The memory 131 includes a page buffer block 132 having a plurality of page buffers PB1 to PBm. However, unlike the memory 130 shown in FIG. 1, the memory 131 does not store the map table 170. The RAM 151 may store the map table 170. For example, the RAM 151 may be embodied in an SRAM; however, the RAM 151 is not limited thereto.

The plurality of map table entries MTE1 to MTEn stored in the map table 170 may be updated by the map table management unit 126. An update process of the map table management unit 126 may be a process of storing new information in the map table entries MTE1 to MTEk or a process of deleting the stored information. Updated map table entries MTE1 to MTEn may be stored in the RAM 151.

Figure 7:
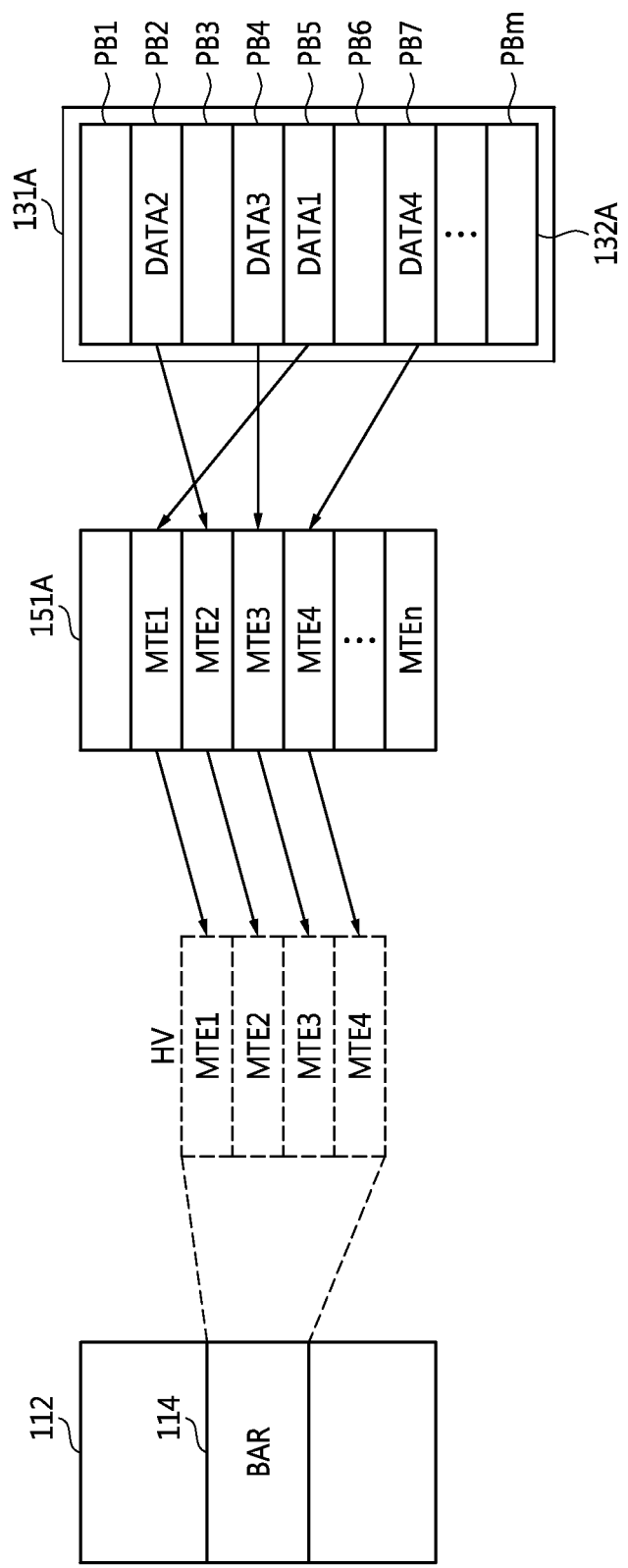
FIG. 7 is a diagram illustrating an exemplary embodiment of a process which processes data using a map table of the PCI device shown in FIG. 6.

FIG. 7 is an exemplary embodiment of a process which processes data using a map table of the PCI device shown in FIG. 6. Referring to FIGS. 1 to 3, 6, and 7, the PCI host (not shown) may access a map table entry (e.g., the first map table entry MTE1) which is converted using one base address included in the BAR 114 of the PCI register 112 and an address off-set, and corresponds to a virtual address.

As exemplified in FIG. 2, it is assumed that data to be processed by the PCI host sequentially includes the first data DATA1, the second data DATA2, the third data DATA3, and the fourth data DATA4 even in FIG. 7.

As shown in FIG. 7, it is assumed that the first data DATA1 is stored in the fifth page buffer PB5, the second data DATA2 is stored in the second page buffer PB2, the third data DATA3 is stored in the fourth page buffer PB4, and the fourth data DATA4 is stored in the seventh page buffer PB7. That is, each of the data DATA1 to DATA4 may be stored in a discrete position in a page buffer block 132A of a memory 131A.

The map table management unit 126 may store a physical address corresponding to a sequence of each of the data DATA1 to DATA4 in each of the first map table entry MTE1 to the fourth map table entry MTE4. When each of the first map table entry MTE1 to the fourth map table entry MTE4 stores each of the physical addresses in advance, a storage operation of the map table management unit 126 may be omitted.

The PCI host may successively access the first map table entry MTE1 to the fourth map table entry MTE4. That is, in a host view (HV), since the first map table entry MTE1 to the fourth map table entry MTE4 are successive, the PCI host may recognize that each of the data DATA1 to DATA4 is successively stored. The PCI device 100A may successively supply each of the data DATA1 to DATA4 to the PCI host using a virtual address of the first map table entry MTE1 and a host off-set for the virtual address. Accordingly, a transaction between the PCI host and the PCI device 100A may be reduced or minimized.

An internal field of map table entries MTE1 to MTE4 shown in FIG. 7 is substantially the same as the internal field of the map table entries MTE1 to MTE4 shown in FIG. 3. Accordingly, description on the internal field of the map table entries MTE1 to MTE4 of FIG. 3 described above may be applied to the map table entries MTE1 to MTE4 shown in FIG. 7 in the same manner.

Figure 8:
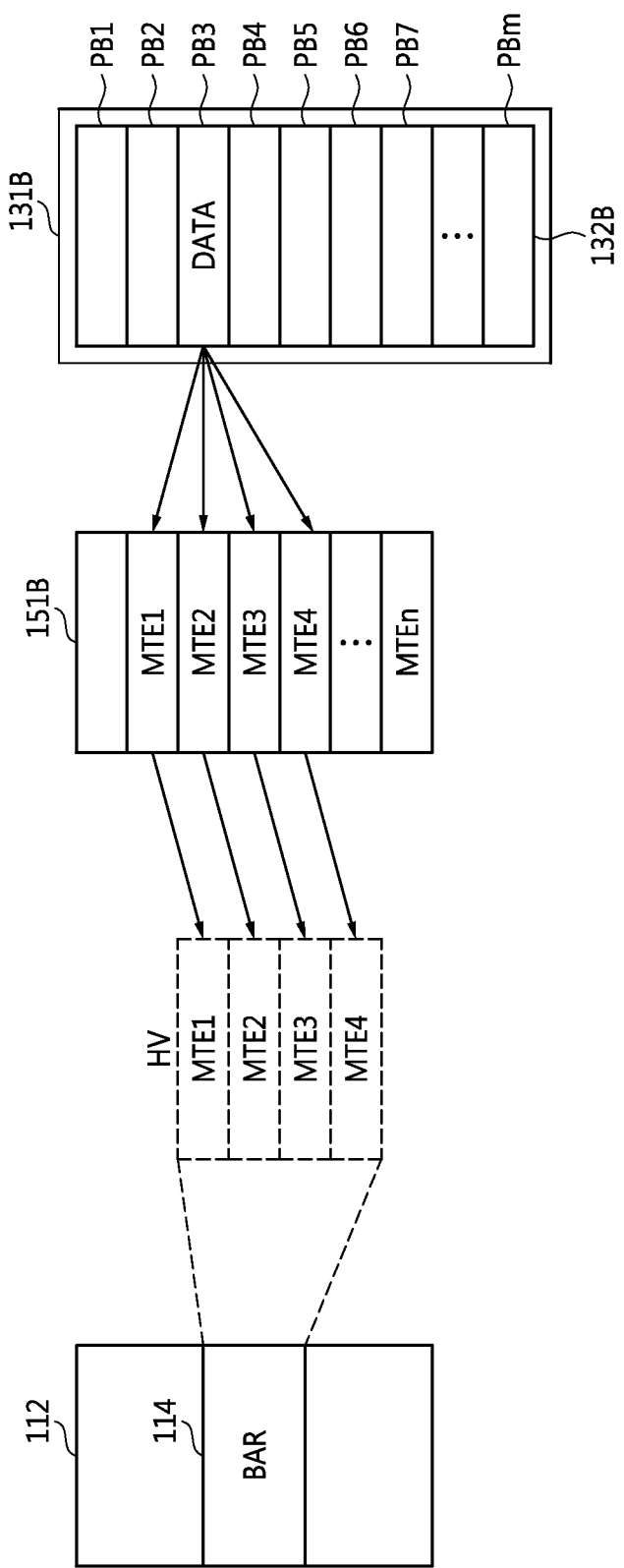
FIG. 8 is a diagram illustrating another exemplary embodiment of a process which processes data using the map table of the PCI device shown in FIG. 6.

FIG. 8 is another exemplary embodiment of the process which processes data using the map table of the PCI device shown in FIG. 6. Referring to FIGS. 1, and 4 to 8, the PCI host (not shown) may access a map table entry, e.g., the first map table entry MTE1, which is converted using one base address included in the BAR 114 of the PCI register 112 and an address off-set, and corresponds to a virtual address.

As exemplified in FIG. 4, it is assumed that data to be processed by the PCI host repeatedly includes data DATA stored in a page buffer (e.g., the third page buffer PB3) of a memory 131B even in FIG. 8. For example, when the data to be processed by the PCI host includes the data DATA stored in the third page buffer PB3 repeatedly four times, the map table management unit 126 may store a physical address of the third page buffer PB3 in each of the first map table entry MTE1 to the fourth map table entry MTE4. When each of the first map table entry MTE1 to the fourth map table entry MTE4 stores the physical address in advance, a storage operation of the map table management unit 126 may be omitted.

The PCI device 100A may repeatedly supply data DATA to the PCI host using a virtual address of the first map table entry MTE1 and a host off-set for the virtual address.

An internal field of map table entries MTE1 to MTE4 shown in FIG. 8 is substantially the same as the internal field of the map table entries MTE1 to MTE4 shown in FIG. 5. Accordingly, description on the internal field of the map table entries MTE1 to MTE4 of FIG. 5 described above may be applied to the map table entries MTE1 to MTE4 shown in FIG. 8 in the same manner.

Figure 9:
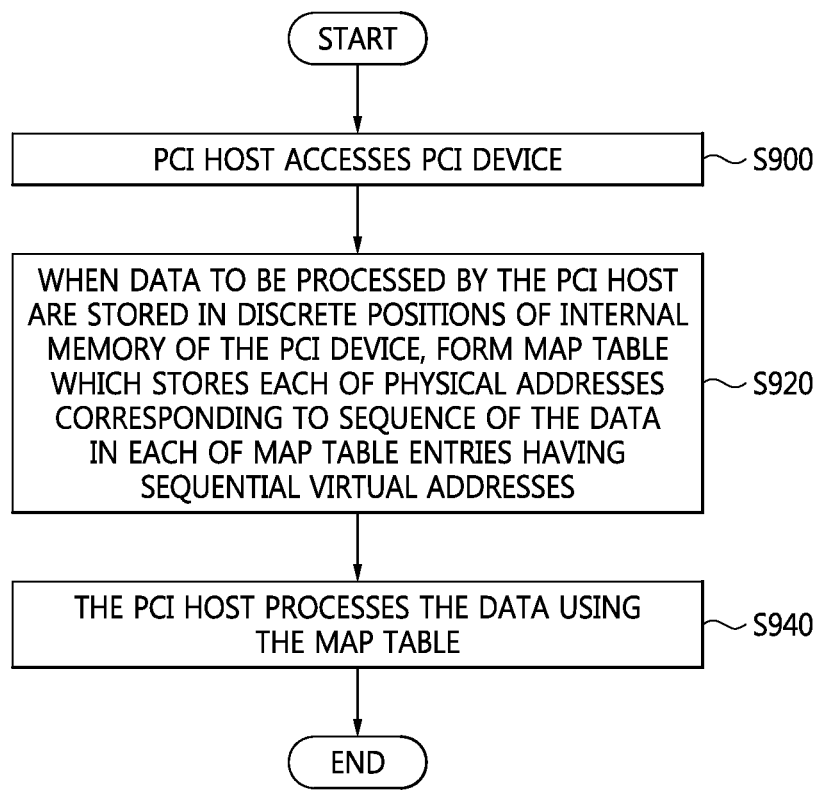
FIG. 9 is a flowchart showing steps of the process of the exemplary embodiments shown in FIGS. 2 and 7.

FIG. 9 is a flowchart which shows various steps of the process of the exemplary embodiments shown in FIGS. 2 and 7. Referring to FIGS. 1 to 3, 6 and 7, and 9, the PCI host (not shown) may access the PCI device 100A or 100B through the PCI bus 300, and may process data (S900).

The data DATA1 to DATA4 to be processed by the PCI host may be stored in discrete positions in the memory 130 or 131. At this time, the map table management unit 126 stores each of physical addresses (e.g., PMA1 to PMA4) corresponding to a sequence of the data DATA1 to DATA4 stored in the memory 130 or 131 in each of successive map table entries (e.g., MTE1 to MTE4) of the map table entries MTE1 to MTEn included in the map table 170 (S920).

The PCI host may access the map table entries MTE1 to MTE4 using a virtual address of the first map table entry MTE1 and a host off-set for the virtual address, and process the data DATA1 to DATA4 (S940).

Figure 10:
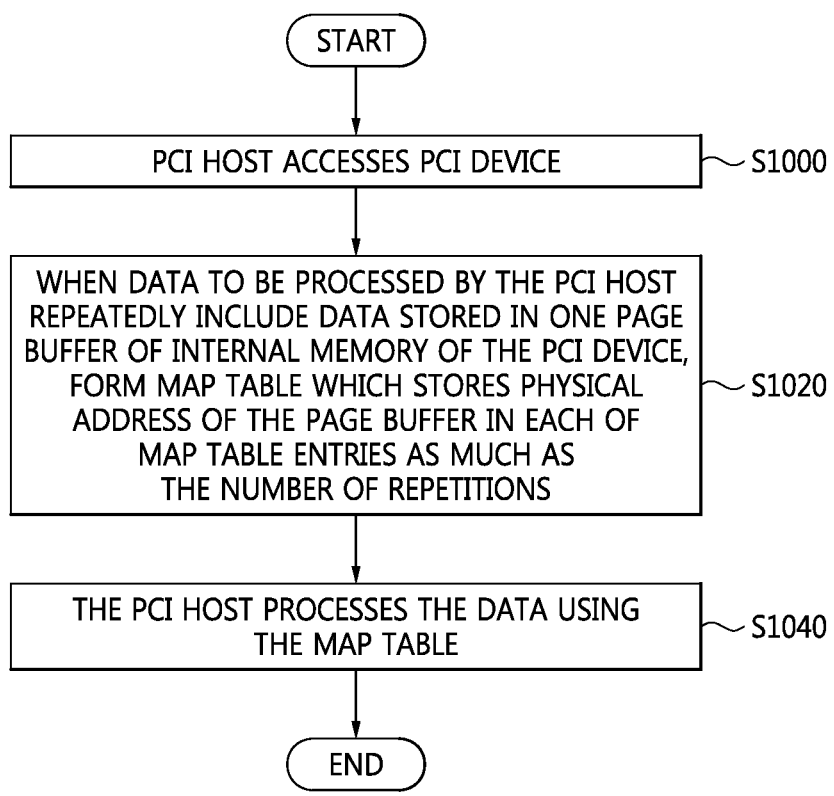
FIG. 10 is a flowchart showing steps of the process of the exemplary embodiments shown in FIGS. 4 and 8.

FIG. 10 is a flowchart which shows various steps of the process of the exemplary embodiments shown in FIGS. 4 and 8. Referring to FIGS. 1, 4 to 6, 8, and 10, the PCI host (not shown) may access the PCI device 100A or 100B through the PCI bus 300, and process data (S1000).

Data to be processed by the PCI host may repeatedly include data (e.g., DATA) stored in one page buffer (e.g., PB3) in the memory 130 or 131. At this time, the map table management unit 126 stores a physical address (e.g., PMA1) of a page buffer (PB3) storing the data DATA in each of the first map table entry MTE1 to the fourth map table entry MTE4 when the number of map table entries, e.g., the number of repetitions, which corresponds to the number of repeating the data DATA among the map table entries MTE1 to MTEn included in the map table 170 is four (S1020). The PCI host accesses the map table entries MTE1 to MTE4 using a virtual address of the first map table entry MTE1 and a host off-set for the virtual address, and processes the data DATA (S1040).

Figure 11:
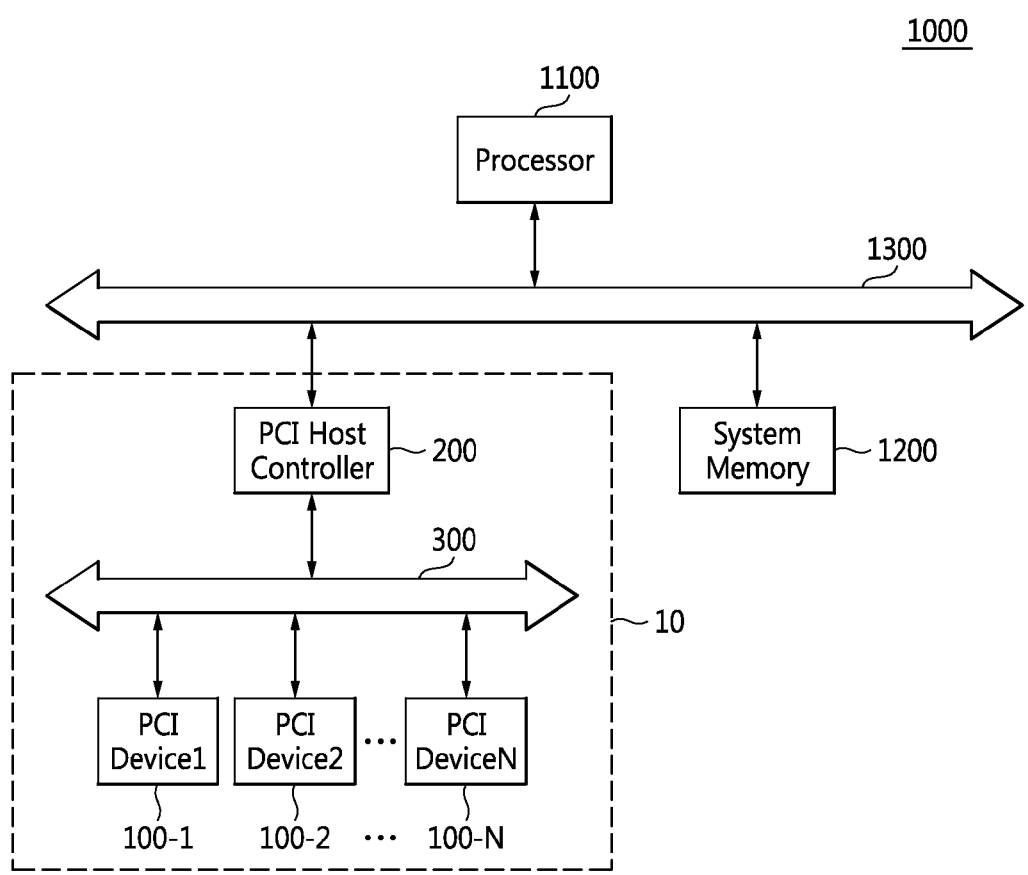
FIG. 11 is a schematic block diagram of a computing system which includes the PCI device and the interface system according to an exemplary embodiment of the present inventive concept.

FIG. 11 is a schematic block diagram of a computing system which includes the PCI device and the interface system according to an exemplary embodiment of the present inventive concept. Referring to FIGS. 1, 6, and 11, a computing system 1000 may include a processor 1100, a system memory 1200, a system bus 1300, and an interface system 10.

The computing system 1000 may be a personal computer (PC) or a laptop computer; however, the computing system is not limited thereto. The processor 1100 may control an operation of the computing system 1000, and control an operation of at least one of PCI devices 100-1 to 100-N, where N is a natural number, through a PCI host controller 200.

The system memory 1200 includes an instruction and/or data necessary for operation of the processor 1100. The system memory 1200 may be an SRAM or a DRAM; however, the system memory is not limited thereto.

The processor 1100, the memory 1200, and the interface system 10 may be connected to each other through the system bus 1300. The system bus 1300 may include at least one of a control bus, an address bus, and a data bus.

The interface system 10 is the interface system 10A shown in FIG. 1 or the interface system 10B shown in FIG. 6. The interface system 10 may include one or more PCI devices 100-1 to 100-N, where N is a natural number. Each of the PCI devices 100-1 to 100-N may be one of the PCI device 100A shown in FIG. 1 and the PCI device 100B shown in FIG. 6.

Each of the PCI devices 100-1 to 100-N may be one of a solid state drive (SSD), a universal flash storage (UFS), a hard disk drive (HDD), a video graphic adapter (VGA) card, a sound adapter card, a network interface card (NIC); however, it is not limited thereto.

A PCI device according to an exemplary embodiment of the present inventive concept accesses a map table having a virtual address when a PCI host performs an access so as to process data stored in an internal memory of the PCI device. The PCI device supplies data of a page buffer having a physical address in a map table entry corresponding to the virtual address to the PCI host. Accordingly, when data to be processed by the PCI host is stored in discrete positions of an internal memory of the PCI device, or data stored in one page buffer is repeatedly included, the map table may be effectively used. Therefore, a space efficiency of the internal memory of the PCI device and system performance can be improved.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A peripheral component interconnect (PCI) device communicating with a host, the PCI device comprising:
   a first memory including a plurality of page buffers having physical addresses;
   a base address register including a plurality of base addresses;
   a first address translation unit configured to translate each of the plurality of base addresses to a corresponding virtual address among a plurality of virtual addresses; and
   a map table including a plurality of map table entries that are each accessed in correspondence to each of the plurality of virtual addresses, and configured to map each of the plurality of virtual addresses onto a corresponding physical address among the physical addresses of the plurality of page buffers, wherein:
   the first address translation unit is configured to translate each of the plurality of virtual addresses to the corresponding physical address using the map table,
   the host identifies each page buffer, among the plurality of page buffers, with a corresponding base address among the plurality of base addresses, and
   the PCI device supplies to the host, in response to receiving a first of the base addresses from the host, first data stored by a first of the page buffers having a first of the physical addresses in a first of the map table entries that corresponds to a first of the virtual addresses that the first address translation unit translates with respect to the first of the base addresses.

2. The PCI device of claim 1, wherein each of the plurality of map table entries includes:
   a host off-set field configured to store a corresponding host off-set; and
   a physical address field configured to store a corresponding physical address among the physical addresses.

3. The PCI device of claim 2, further comprising a map table management unit configured to allocate each of the plurality of virtual addresses to each of the plurality of map table entries so as to access each of the plurality of map table entries, and to store the corresponding host off-set and the corresponding physical address in each of the plurality of map table entries.

4. The PCI device of claim 3, wherein the map table management unit is configured to, when data to be processed by a host is stored in discrete positions in the first memory, sequentially store the corresponding host off-set in the host off-set field of each of a plurality of successive map table entries among the map table entries, and store the physical addresses of page buffers storing the data, among the page buffers, in the physical address field of each of the plurality of successive map table entries according to a sequence of the data.

5. The PCI device of claim 3, wherein the map table management unit is configured to, when data to be processed by a host repeatedly includes data stored in one of the page buffers, store the physical address of the one page buffer in the physical address field of each of map table entries, among the map table entries, corresponding to a number of data repetitions.

6. The PCI device of claim 2, wherein each of the plurality of map table entries further includes an attribute field which sets at least one of a read attribute and a write attribute with respect to the page buffer corresponding to the physical address stored in the physical address field.

7. The PCI device of claim 1, further comprising:
a second memory, wherein
the map table is stored in one of the first memory and the second memory.

8. The PCI device of claim 7, wherein, when the map table is stored in the first memory, the second memory is configured to load at least one of the plurality of map table entries included in the map table from the first memory.

9. The PCI device of claim 1, wherein the PCI device defines one of a solid state drive (SSD), a universal flash storage (UFS), and a hard disk drive (HDD).

10. An interface system comprising:
a peripheral component interconnect (PCI) bus;
at least one PCI device connected to the PCI bus; and
a host controller connecting the at least one PCI device to a host through the PCI bus according to a request of the host, wherein:
the at least one PCI device includes:
a first memory including a plurality of page buffers having physical addresses,
a base address register including a plurality of base addresses,
a first address translation unit configured to translate each of the plurality of base addresses to a corresponding virtual address among a plurality of virtual addresses, and
a map table including a plurality of map table entries that are each accessed in correspondence to each of the plurality of virtual addresses, and configured to map each of the plurality of virtual addresses onto a corresponding physical address among the physical addresses of the plurality of page buffers,
the first address translation unit is configured to translate each of the plurality of virtual addresses to the corresponding physical address using the map table,
the host identifies each page buffer, among the plurality of page buffers, with a corresponding base address among the plurality of base addresses, and
the at least one PCI device supplies to the host, in response to receiving a first of the base addresses from the host, first data stored by a first of the page buffers having a first of the physical addresses in a first of the map table entries that corresponds to a first of the virtual addresses that the first address translation unit translates with respect to the first of the base addresses.

11. The interface system of claim 10, wherein each of the plurality of map table entries includes:
a host off-set field configured to store a corresponding host off-set among a plurality of host off-sets; and
a physical address field configured to store a corresponding physical address among the physical addresses.

12. The interface system of claim 11, wherein the at least one PCI device further comprises a map table management unit configured to allocate each of the plurality of virtual addresses to each of the plurality of map table entries so as to access each of the plurality of map table entries, and to store the corresponding host off-set and the corresponding physical address in each of the plurality of map table entries.

13. The interface system of claim 12, wherein the map table management unit is configured to, when data to be processed by a host is stored in discrete positions in the first memory, sequentially store the corresponding host off-set in the host off-set field of each of a plurality of successive map table entries, among the map table entries, and store the physical addresses of page buffers storing the data, among the page buffers, in the physical address field of each of the plurality of successive map table entries according to a sequence of the data.

14. The interface system of claim 12, wherein the map table management unit is configured to, when data to be processed by a host repeatedly includes data stored in one of the page buffers, store the physical address of the one page buffer in the physical address field of each of map table entries, among the map table entries, corresponding to a number of data repetitions.

15. A method of operating a peripheral component interconnect (PCI) device communicating with a host, the PCI device including a first memory with a plurality of page buffers having physical addresses, and a base address register including a plurality of base addresses, each of the plurality of base addresses being used by the host to identify a corresponding page buffer among the plurality of page buffers of the PCI device, the method comprising:
translating each of the plurality of base addresses to a corresponding virtual address among a plurality of virtual addresses;
mapping each of the plurality of virtual addresses onto a corresponding physical address among the physical addresses of the plurality of page buffers in map table entries of a map table;
accessing the map table entries corresponding to each of the plurality of virtual addresses;
translating each of the plurality of virtual addresses to the corresponding physical address using the map table; and
supplying to the host, in response to receiving a first of the base addresses from the host, first data stored by a first of the page buffers having a first of the physical addresses in a first of the map table entries that corresponds to a first of the virtual addresses translated with respect to the first of the base addresses.

16. The method of claim 15, wherein each of the map table entries includes
a host off-set field configured to store a corresponding host off-set; and
a physical address field configured to store a corresponding physical address among the physical addresses.

17. The method of claim 16, further comprising allocating each of the plurality of virtual addresses to each of the map table entries with a map table management unit so as to access each of the map table entries, and store the corresponding host off-set and the corresponding physical address in each of the map table entries.

18. The method of claim 17, wherein when data to be processed by a host is stored in discrete positions in the first memory, the map table management unit sequentially stores the corresponding host off-set in the host off-set field of each of a plurality of successive map table entries, among the map table entries, and stores the physical addresses of page buffers storing the data, among the page buffers, in the physical address field of each of the plurality of successive map table entries according to a sequence of the data.

19. The method of claim 17, wherein when data to be processed by a host repeatedly includes data stored in one of the page buffers, the map table management unit stores the physical address of the one page buffer in the physical address field of each of map table entries, among the map table entries, corresponding to a number of data repetitions.

* * * * *